UNITED STATES PATENT OFFICE 2,942,501
Patented June 28, 1960

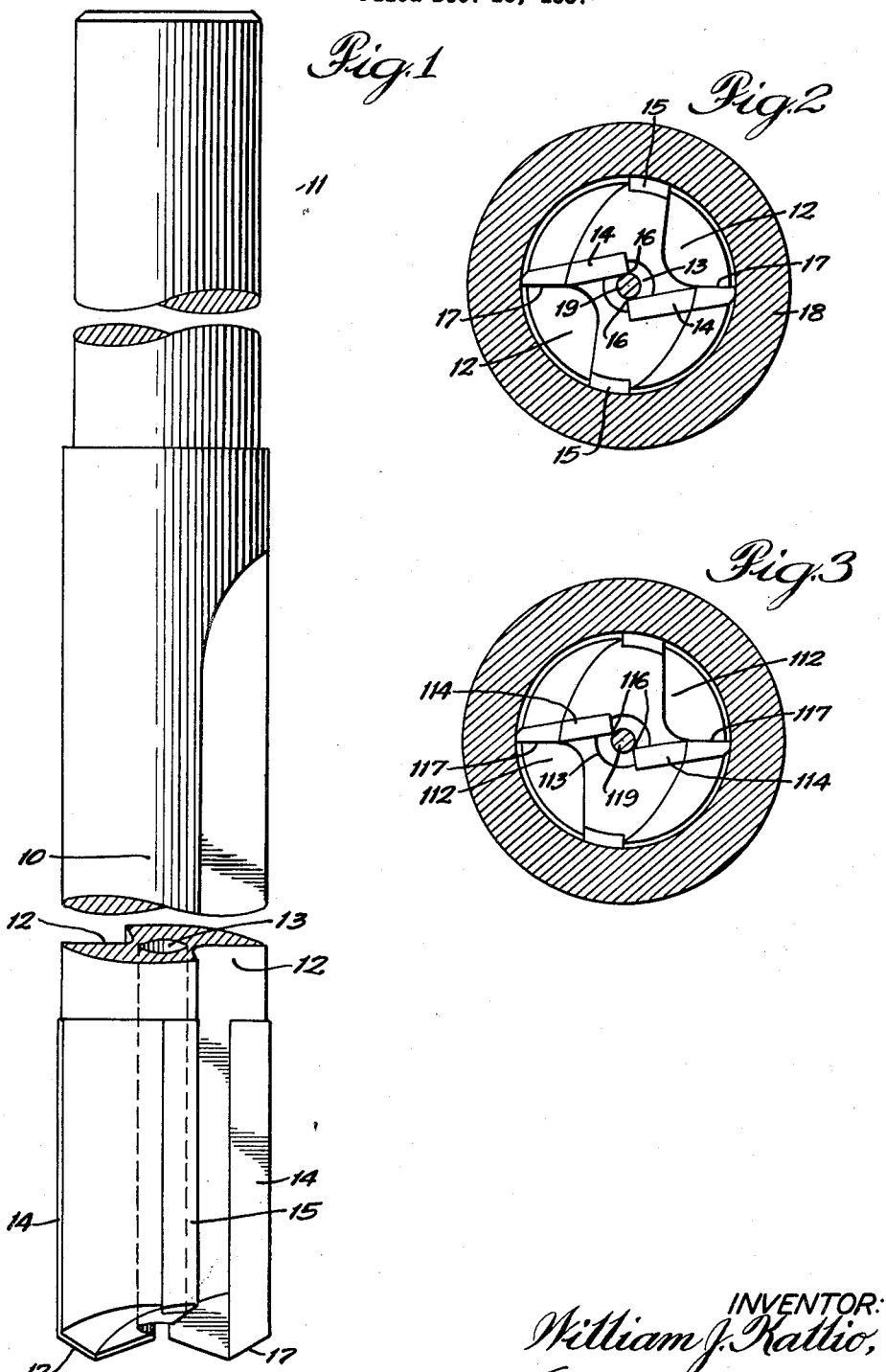

2,942,501

DRILL

William J. Kallio, Glen Ellyn, Ill., assignor to United-Greenfield Corporation, Chicago, Ill., a corporation of Delaware Filed Dec. 16, 1957, Ser. No. 702,982

6 Claims. (Cl. 77—68)

This invention relates to drills and more particularly to deep hole metal drills.

Gun drills have heretofore been proposed in which the drill body is provided with an axial bore and a cutting edge terminating outside of the bore to leave a core in the center of the drill hole to assist in guiding the drill and keeping it straight. With drills of this type, if the axial bore is centered in the drill body, the core tends to bind in the bore. To eliminate this difficulty, it has been proposed to arrange the axial bore eccentrically of the body so that the core is smaller than the bore and engages the bore at one side only thereof. Such drills, however, are badly unbalanced and are not adequately guided by the core due to the fact that they engage it at one side only.

It is accordingly an object of this present invention to provide a drill of the core type which is perfectly balanced and which operates freely without binding.

Another object is to provide a drill in which the core engages the cutting edges of the drill at diametrically opposite points.

According to a feature of the invention, the cutting edges are formed on flat inserts of hard cutting material which extend into the axial bore in the body to leave a core smaller than the bore to engage the core to guide the drill. The inner portions of the cutting edges preferably lie in planes parallel to and spaced on opposite sides of an axial plane to increase the chip breaking action and the outer portions of the cutting edges preferably lie in radial planes for efficient cutting.

The above and other objects and features of the invention will be more readily apparent from the following description when read in connection with the accompanying drawing, in which:

Figure 1 is a side elevation of a drill embodying the invention;

Figure 2 is an end elevation of the drill illustrating in section material in which a hole is being drilled; and Figure 3 is a view similar to Figure 2 of an alternative construction.

The drill as shown comprises an elongated body 10 provided at one end with a shank 11 for mounting it in a spindle and terminating at the opposite end in a cutting tip. The body is formed with diametrically opposite chip flutes 12 which, as shown extend in a straight axial direction, although spiral chip flutes could be used equally well if desired.

The body is formed with a central axial bore 13 therein through which coolant or lubricant can be supplied to the cutting tip to cool and lubricate the tip and to flush the chips out through the chip flutes.

The cutting edges of the drill are provided by inserts 14 of hard cutting material such, for example, as tungsten carbide, which are attached to the cutting tip at the trailing sides of the chip flutes with respect to the direction of drill rotation. At diametrically opposite points intermediate the inserts 14 hard wear pads 15 may be secured to the drill body to guide it during the drilling operation. The inserts 14 are sharpened at their leading edges and are preferably V-shaped at their tips to provide cutting edges. The radially inner portions of the inserts lie in planes parallel to and spaced on opposite sides of an axial plane and terminate in relatively sharp corners 16 within the axial bore 13 and diametrically opposite to each other. The outer portions of the inserts are shaped to provide outer cutting surfaces 17 which lie in a common axial plane.

With this construction, when the drill is used as illustrated in Figure 2, the cutting edges formed on the inserts 14 will cut a circular bore in a workpiece as indicated at 18. Since the cutting edges are identical and are diametrically opposite, the force on the drill during cutting will be perfectly balanced so that the drill can be turned easily and will tend to drill a straight bore. Since the cutting edges at their inner ends are spaced apart within the axial bore 13, they will leave a core as shown at 19 centered axially in the bore and in the axial opening 13 in the drill body. The inner edge portions of the inserts will engage this core at diametrically opposite points and lie tangent to the core so that they tend to wipe over the core with a burnishing action. Thus the core rod tends to hold the drill accurately centered and to support it at diametrically opposite points. Furthermore, the backward rake on the inner portions of the cutting edges provides an improved chip breaking action tending to break the chips into small pieces which can easily be flushed out through the chip flutes 12. Thus, the drill of the present invention will always drill rapidly and with an extremely high degree of accuracy.

The construction of Figure 3 is substantially similar to that of Figures 1 and 2 and parts therein corresponding to like parts in Figures 1 and 2 are indicated by the same reference numerals, plus 100. In this construction, the adjacent faces of the inserts 114 are spaced on opposite sides of an axial plane that are spaced more closely than the inserts of Figures 1 and 2. The inserts 114 terminate in axially extending cutting edges 116 which will engage and cut the core 119 on diametrically opposite sides thereof. It will be noted that in this case the core 119 is larger in diameter than the distance between the planes of the adjacent faces of the inserts 114. Therefore, the cutting edges 116 will cut over the surface of the core and will bear against the core at diametrically opposite points to guide the drill.

While two embodiments of the invention have been shown and described in detail it will be understood that these are illustrative only and are not to be taken as a definition of the scope of the invention, reference being had for this purpose to the appended claims.

What is claimed is:

1. A drill comprising an elongated drill body terminating at one end in a cutting tip and formed with an axial bore therein extending to the cutting tip, and means at the cutting tip defining a pair of cutting edges extending outward from the axial bore in opposite directions in spaced planes parallel to and on opposite sides of an axial plane, and terminating in diametrically spaced ends within and spaced inward from the wall of the bore, the cutting edges leaving a central core within the bore and the planes of the cutting edges being substantially tangent to said core.

2. The drill of claim 1 in which the cutting edges have radially outer portions lying in a common plane intersecting the axis of the body.

3. A drill comprising an elongated drill body terminating at one end in a cutting tip and formed with an axial bore therein extending to the cutting tip, flat inserts of hard cutting material secured to the cutting tip with their adjacent faces lying in spaced planes parallel to and spaced from an axial plane and defining cutting edges, the inner edges of the inserts projecting into the axial bore beyond the inner wall of the bore and terminating in diametrically spaced corners, the cutting edges leaving a central core within the bore and the planes of the cutting edges being substantially tangent to said core.

4. The drill of claim 3 in which the inserts are formed with radially outer edge portions lying in an axial plane.

5. A drill comprising an elongated drill body terminating at one end in a cutting tip and formed with an axial bore therein extending to the cutting tip, flat inserts of hard cutting material secured to the cutting tip with their adjacent faces lying in spaced planes parallel to and spaced from an axial plane and defining cutting edges, the inserts projecting into the axial bore in said spaced planes and terminating tangent to a circle coaxial with and of smaller diameter than the bore, the diameter of said circle being equal to the space between said spaced planes.

6. A drill comprising an elongated drill body terminating at one end in a cutting tip and formed with an axial bore therein extending to the cutting tip, flat inserts of hard cutting material secured to the cutting tip with their adjacent faces lying in spaced planes parallel to and spaced from an axial plane and defining cutting edges, the inserts projecting into the axial bore in said planes and terminating in axially extending spaced cutting edges spaced outward from an axial plane perpendicular to said spaced planes to leave a core in the work of larger diameter than the space between said spaced planes, the cutting edges engaging the core at diametrically opposite points.

References Cited in the file of this patent
UNITED STATES PATENTS

| | | |
|---|---|---|
| 1,271,396 | Walker | July 2, 1918 |
| 2,013,348 | Howard et al. | Sept. 3, 1935 |
| 2,188,631 | Kraus | Jan. 30, 1940 |

FOREIGN PATENTS

| | | |
|---|---|---|
| 122,524 | Great Britain | Jan. 30, 1919 |